US010143020B2

(12) United States Patent
Bouvet et al.

(10) Patent No.: US 10,143,020 B2
(45) Date of Patent: Nov. 27, 2018

(54) METHOD AND DEVICE FOR ESTABLISHING A COMMUNICATION

(71) Applicant: Orange, Paris (FR)

(72) Inventors: Bertrand Bouvet, Perros Guirec (FR); Fabrice Fauchoux, Louannec (FR); Catherine Salou, Lannion (FR); Mathieu Pirio, Perros Guirec (FR); Ghislain Moncomble, Plestin les Greves (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/318,959

(22) PCT Filed: Jun. 15, 2015

(86) PCT No.: PCT/FR2015/051580
§ 371 (c)(1),
(2) Date: Dec. 14, 2016

(87) PCT Pub. No.: WO2016/001504
PCT Pub. Date: Jan. 7, 2016

(65) Prior Publication Data
US 2017/0118780 A1    Apr. 27, 2017

(30) Foreign Application Priority Data

Jun. 30, 2014 (FR) ..................................... 14 56121

(51) Int. Cl.
*H04W 4/00* (2018.01)
*H04W 72/08* (2009.01)
(Continued)

(52) U.S. Cl.
CPC ......... *H04W 76/10* (2018.02); *H04L 65/1069* (2013.01); *H04M 15/06* (2013.01);
(Continued)

(58) Field of Classification Search
CPC ... H04L 65/1069; H04M 15/06; H04M 15/83; H04M 15/8351; H04M 15/84;
(Continued)

(56) References Cited

U.S. PATENT DOCUMENTS 8,040,874 B2 * 10/2011 Skog ................... H04M 7/0024
370/240
9,112,930 B2 * 8/2015 Jafry ....................... H04L 65/40
(Continued)

FOREIGN PATENT DOCUMENTS

DE    10 2006 057 817 A1    6/2008
WO    WO 2011/124760 A1    10/2011

OTHER PUBLICATIONS

Translation of Written Opinion of the International Searching Authority dated Nov. 15, 2015 for International Application No. PCT/FR2015/051580 filed Jun. 15, 2015, 9 pages.
(Continued)

*Primary Examiner* — Liton Miah
(74) *Attorney, Agent, or Firm* — Knobbe, Martens, Olson & Bear, LLP

(57) ABSTRACT

One embodiment relates to a method for establishing communication between at least one calling terminal and one called terminal, implemented by the calling terminal. The method comprises detecting the activation by the calling terminal of a request to establish a communication with the called terminal, obtaining a first piece of communication context information related to the calling terminal, and obtaining at least a second piece of communication context information related to the called terminal. The method also comprises determining a communication service to use in order to establish the requested communication with the called terminal, the determining being carried out from at least the first piece of communication context information and the second piece of communication context information,
(Continued)

Figure 1:
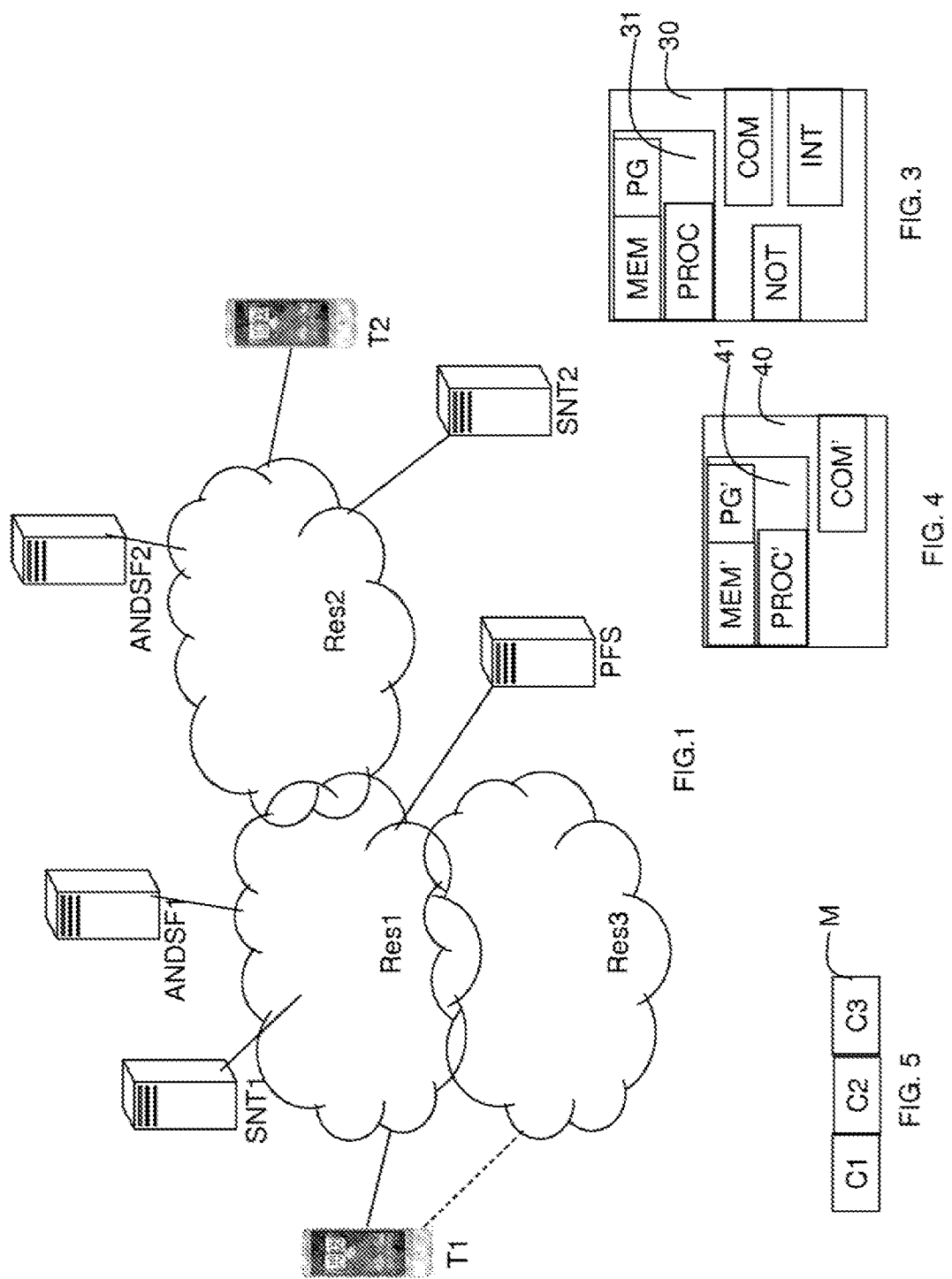

and sending, to the called terminal, a request for communication according to the determined communication service.

6 Claims, 2 Drawing Sheets

(51) Int. Cl.
  *H04L 29/06* (2006.01)
  *H04W 76/10* (2018.01)
  *H04W 4/60* (2018.01)
  *H04M 15/06* (2006.01)
  *H04M 15/00* (2006.01)
  *H04M 1/725* (2006.01)
  *H04W 88/06* (2009.01)

(52) U.S. Cl.
  CPC ....... *H04M 15/83* (2013.01); *H04M 15/8351* (2013.01); *H04M 15/84* (2013.01); *H04M 15/844* (2013.01); *H04M 15/85* (2013.01); *H04M 15/858* (2013.01); *H04W 4/60* (2018.02); *H04W 72/085* (2013.01); *H04M 1/72569* (2013.01); *H04M 2215/42* (2013.01); *H04M 2215/7464* (2013.01); *H04W 88/06* (2013.01)

(58) Field of Classification Search
  CPC .. H04M 15/844; H04M 15/85; H04M 15/858; H04M 1/72569; H04M 2215/42; H04M 2215/7464; H04W 4/003; H04W 72/085; H04W 76/02; H04W 88/06
  See application file for complete search history.

(56) References Cited

U.S. PATENT DOCUMENTS

| | | | | |
|---|---|---|---|---|
| 2012/0281685 A1* | 11/2012 | Kotecha | ................ | H04W 76/04 370/338 |
| 2013/0301529 A1* | 11/2013 | Lindsay | ................. | H04W 4/12 370/328 |
| 2013/0336308 A1* | 12/2013 | Laasik | ................ | H04M 7/0057 370/352 |
| 2014/0071889 A1* | 3/2014 | Aksu | ................. | H04L 29/06278 370/328 |
| 2015/0296078 A1* | 10/2015 | Sun | ....................... | H04L 65/104 370/259 |

OTHER PUBLICATIONS

French Search Report dated Mar. 18, 2015 for French Application No. FR1456121 filed Jun. 20, 2014, 12 pages.
GSM Association. Rich Communication Suite 5.1 Advanced Communications, Services and Client Specification, Version 1.0. GSM Association Non-Confidential Official Document, RCS 5.1: Services and Client Specification. Retrieved from the Internet on Jun. 10, 2014: URL:http://www.gsma.com/network2020/rcs/specs-and-product-docs/, Aug. 13, 2012,100 pages.
NSN et al. Third Generation Parnership Project. (Compromising) WLAN IW Solution for UEs with and without ANDSF. 3GPP TSG-RAN WG2 Meeting #83, Barcelona, Spain, Aug. 19-23, 2013, R2-132327, Aug. 23, 2013, 5 pages.
International Search Report dated Nov. 15, 2015 for International Application No. PCT/FR2015/051580 filed Jun. 15, 2015, 7 pages.
Written Opinion dated Nov. 15, 2015 for International Application No. PCT/FR2015/051580 filed Jun. 15, 2015, 7 pages.

* cited by examiner

METHOD AND DEVICE FOR ESTABLISHING A COMMUNICATION

RELATED APPLICATIONS

This application is the U.S. National Phase of Application No. PCT/FR2015/051580 entitled "METHOD AND DEVICE FOR ESTABLISHING A COMMUNICATION" filed Jun. 15, 2015, which designated the United States, and which claims the benefit of French Application No. 1456121 filed Jun. 30, 2014.

Today, a caller user and a called user can communicate via their respective terminals according to various modes of communication such as a telephone communication, a videophone communication, a communication via text or multimedia (SMS for Short Message Service), or MMS (for Multimedia Message Service) or else IM (for Instant Messaging) messages, a communication of the whiteboard type, etc.

In order to implement a particular mode of communication, for example a videophone communication, the terminal of the caller user and the terminal of the called user can dispose of several available communication services offering this particular mode of communication. Such communication services are available depending on the connectivity of the terminal of the caller user, respectively of the terminal of the called user, to a communications network of an operator to which the user of the caller terminal, respectively the user of the called terminal, is subscribed.

For example, a communication service used to send a communication request for the attention of a terminal of the called user is different depending on the type of network to which the terminal of the caller user is connected, such as for example a 2G, EDGE, 3G or even 4G, or other, network for a mobile access network or a WiFi, ADSL, VDSL, Fiber, Cable, Lifi or other network for a fixed access network.

Thus, for example, a communication in videophone mode may be established between the terminal of the caller user and the terminal of the called user via a communication service supplied by the operators of these terminals when the terminals are connected to a 4G mobile network. In this case, the communication service is implemented on each terminal by a communications application native to the terminal. In general, the communications application native to the terminal of the caller user is activated by means of a dedicated physical button disposed on the terminal of the caller user or by means of a touchscreen button displayed on an interface of the terminal of the caller user. When the caller user presses or clicks such a button to trigger the sending of a communication request, the communication service used for initiating the communication request depends on the communications network to which the terminal of the caller user is connected. In certain cases, for example if the caller user triggers a communication request in videophone mode to the terminal of the called user and the terminal of the caller user or the terminal of the called user is connected to a 2G communications network not providing a videophone service, the communication request may fail without the caller user understanding the reason for the failure, which can create a frustration of the caller user in his/her use of the communication service.

When the communication request sent by the terminal of the caller user arrives, the quality of the communication established may also be dependent on the communications network to which the terminal of the caller user is connected and/or on the communications network to which the terminal of the called user is connected. In the previous example, in the case where the terminal of the caller user and the terminal of the called user are connected to a 4G communications network, the communication established in videophone mode disposes of a guaranteed quality of service provided by the QoS mechanism specified by the 3GPP (for Third Generation Partnership Project) and implemented by the 4G communications network.

The same is not true when the terminal of the caller user or the terminal of the called user is connected to a communications network not providing a guaranteed quality of service.

For example, the communication in videophone mode may also be established over a 3G mobile network via a videophone service according to the RCS (for Rich Communication Suite) standard when the terminal of the caller user and the terminal of the called user both dispose of the corresponding RCS application. In this case, the quality of service of the communication established in videophone mode cannot be guaranteed because the RCS videophone service operates over an IP (for Internet Protocol) data network operating in a known mode called "Best Effort".

When the terminal of the caller user and the terminal of the called user are compatible with the RCS standard, information is displayed in the native directory of the caller terminal in association with the contact information the called user. This information allows it to be indicated to the caller user that he/she can use the RCS standard to establish a communication. In this example, the caller user then disposes of several pieces of information indicating to him/her that he/she can establish a communication via various communication services.

The communication in videophone mode may also be established between the terminal of the caller user and the terminal of the called user via a communication service provided by a third-party service provider using an application previously downloaded and installed on each of the terminals. This type of application is, in general, supplied by service providers, referred to as OTT (for Over The Top), not disposing of communications networks infrastructure. These OTT service providers then provide communication services via an IP data network based on an infrastructure managed by a communications network operator. In general, a communications application supplied by an OTT service provider and installed on a terminal of a user may insert into the native directory of the terminal information relating to the contacts that are contained in the directory and which may be contacted via the communications application supplied by the OTT service provider.

In view of the relatively high number of communications applications thus available in a terminal, a caller user who wishes to communicate with a called user must then choose the communications application using which he/she wishes to request the establishment of a communication. Such a choice may have an impact on the quality of service of the communication which will be established and the services available during the communication. The caller user is not necessarily aware of the application providing the best quality of service at the time when he/she initiates the communication request.

Such a choice may also have an impact on the outcome of the communication request if the caller user chooses a communications application that is installed on the terminal of the called user but which is not executed by the terminal of the called user or a communications application for which the terminal of the called user has not registered in the communications network.

One of the aims of the invention is to provide improvements with respect to the prior art.

For this purpose, it provides a method for establishing a communication between at least one caller terminal and a called terminal. Such a method comprises:
- a step for detecting the activation by the caller terminal of a request for the establishment of a communication with the called terminal,
- a step for obtaining a first piece of communication context information relating to the caller terminal,
- a step for obtaining at least a second piece of communication context information relating to the called terminal,
- a step for determining a communication service to be used for establishing said requested communication with the called terminal, the determination being carried out based on at least the first piece of communication context information and the second piece of communication context information,
- a step for sending, to the called terminal, a communication request according to the communication service determined.

The invention thus allows a caller terminal to trigger a communication request destined for a called terminal according to a communication service determined as a function of the communication context of the called terminal and of the communication context of the caller terminal. The user of the caller terminal thus does not need to worry about the communication service to be selected or the communications application to be activated in order to establish a communication with the called terminal.

The method according to the invention is applicable to the case where the request to establish a communication is made for a predetermined mode of communication, for example if the user of the caller terminal selects a videophone or voice mode of communication.

The method according to the invention is also applicable to the case where the request to establish a communication is made for several modes of communication, for example if the user of the caller terminal selects the called terminal but does not specify any mode of communication. In this case, during the determination of the communication service, the mode of communication according to which the communication will be established is also determined.

The various embodiments or features mentioned hereinafter may be added independently, or in combination with one another, to the features of the method defined hereinabove.

According to one particular embodiment of the invention, the communication context information relating to the caller terminal comprises at least one of the three following pieces of information:
- information indicating at least one communications network to which the caller terminal is connected or at least one communications network to which the caller terminal is able to connect,
- information indicating at least one communications application able to be used for establishing said requested communication,
- information indicating a capacity of the caller terminal such as: camera, microphone, sensors, current battery level, etc.

According to one particular embodiment of the invention, the communication context information relating to the called terminal comprises at least one of the three following pieces of information:
- information indicating at least one communications network to which the called terminal is connected or a communications network to which the called terminal is able to connect,
- information indicating at least one communications application able to be used for establishing a communication with the called terminal,
- information indicating a capacity of the called terminal such as: camera, microphone, sensors, current battery level, etc.

The term 'communication context of a terminal' is notably understood to mean the type of connectivity of the terminal, in other words the communications network or networks to which the terminal is connected or is able to be connected, or the communications applications installed and executed on the terminal. Such communications applications are for example communications applications native to the terminal or communications applications supplied by an OTT service provider. A communications application native to a terminal is a communications application installed by the constructor of the terminal and using a communication service provided by a communications network operator to which the user of the terminal is subscribed.

According to particular embodiments of the invention hereinabove, the caller terminal can determine the communication service to be used for communicating with the called terminal depending on the type of communications network available for communicating between the two terminals or depending on the communications applications common to both terminals.

Advantageously, the communication context information relating to the called terminal is obtained from a service platform with which the caller terminal and the called terminal have registered. Thus, the caller terminal can obtain the communication context information relating to the called terminal when it cannot contact the called terminal directly in order to obtain this information, for example because an interoperability between the caller terminal and the called terminal relating to the exchanges needed for obtaining such information has not been defined.

According to another particular embodiment of the invention, the communication context information relating to the called terminal is obtained from the called terminal. This particular embodiment of the invention requires an interoperability between the called terminal and the caller terminal relating to the exchanges needed for obtaining the communication context information relating to the called terminal. Such an embodiment is less costly to implement because it avoids the setting up of a service platform linked to the invention. According to this particular embodiment of the invention, a message standardized by a 3GPP standard and dedicated to the communication context information of the invention may for example be used to supply such context information.

According to another particular embodiment of the invention, when at least two communication services can be implemented between the caller terminal and the called terminal, the determination step selects, from amongst said communication services, a communication service supplying the best quality of service. According to this particular embodiment of the invention, the communication established between the caller terminal and the called terminal thus benefits from an optimum quality depending on the communications networks to which the caller terminal and the called terminal are connected.

According to another particular embodiment of the invention, when the caller terminal is connected to a first communications network which is different from a second communications network over which the communication service determined is implemented, it comprises a step for connection of the caller terminal to the second communications network.

In this particular embodiment of the invention, the communication service determined is implemented on a communications network to which the caller terminal is able to connect, but is not connected at the time of the request for establishing a communication. Advantageously, according to this particular embodiment of the invention, the connection of the caller terminal is modified in such a manner as to establish a communication according to the communication service determined.

For example, the caller terminal is connected to a mobile communications network of 3G type and is able to connect to a WiFi terminal for access to a fixed IP communications network which is located close to the caller terminal. According to this example, the communication service determined is a communication service provided by an OTT service provider using an IP communications network. According to this particular embodiment of the invention, the caller terminal is then connected to the WiFi access terminal of the fixed IP communications network.

According to another example, the caller terminal may be connected to a 3G mobile communications network whereas it is able to connect to a 4G mobile communications network. For example, the connection to the 3G mobile communications network instead of the 4G mobile communications network has been imposed by a function for managing connection to the communications network of the operator of the communications network to which the user of the caller terminal is subscribed, such as the ANDSF (for Access Network Discovery and Selection Function) function defined by the 3GPP standard. When the communication service determined is a communication service using the 4G communications network, for example a ViLTE (for Video over LTE, LTE for Long Term Evolution) videophone service or a VoLTE (for Voice over LTE) voice communication service, this particular embodiment of the invention allows the caller terminal to connect to the 4G communications network in order to establish the requested communication and to benefit from the quality of service offered by the 4G communications network.

According to another particular embodiment of the invention, when the called terminal is connected to a third communications network which is different from a second communications network over which the communication service determined is implemented, it comprises a step for sending, for the attention of the called terminal, a request for connection of the called terminal to the second communications network, such that the called terminal connects to the second communications network. In this particular embodiment of the invention, the communication service determined is implemented over a communications network to which the called terminal is able to connect but is not connected at the time of the request for establishing a communication. Advantageously, according to this particular embodiment of the invention, the connectivity of the called terminal is modified so as to establish a communication according to the communication service determined.

According to another particular embodiment of the invention, when the request for establishing a communication is carried out for at least two modes of communication, the communication context information relating to the caller terminal comprises information relating to a history of communications previously established between the caller terminal and the called terminal, referred to as history information. The method then comprises a step for determining a mode of communication as a function of said history information. The communication service is then determined for the mode of communication determined.

According to this particular embodiment of the invention, the communication history comprises for example the frequency of communications between the caller terminal and the called terminal, together with the mode in which the caller terminal and the called terminal usually communicate. The caller terminal thus takes into account the frequency and the mode of communication with which the caller terminal and the called terminal are used to communicating in order to determine the mode of communication in which the communication will be requested. This particular embodiment of the invention allows the chances of success that the communication request will be accepted by the called terminal to be increased.

The invention also relates to a terminal, referred to as caller terminal, capable of establishing a communication with a called terminal. The caller terminal comprises:
 a user interface designed to detect the activation of a request for establishing a communication with the called terminal,
 a processing module capable of:
  obtaining a piece of communication context information relating to the caller terminal,
  obtaining a piece of communication context information relating to the called terminal,
  determining, based on at least one piece of communication context information relating to the caller terminal and one piece of communication context information relating to the called terminal, a communication service to be used for establishing a communication requested via the user interface,
 a communications module designed to send, to the called terminal, a communication request according to the communication service determined.

The various embodiments or features mentioned hereinafter may be added, independently or in combination with one another, to the steps of the caller terminal defined hereinabove.

The invention also relates to a method for supplying communication context information relating to a first terminal. Such a method comprises:
 a step for receiving a request for communication context information relating to the first terminal, the request having been sent by a second terminal wishing to establish a communication with the first terminal,
 a step for supplying said context information to the second terminal.

Such a supply method may advantageously be implemented by the first terminal. In such a variant, the first terminal and the second terminal may communicate, for example, according to the SIP protocol by means of SIP messages dedicated to the invention. For example, the request for context information relating to the first terminal may be sent in the form of an SIP message OPTIONS comprising a field dedicated to the invention. According to this example, the first terminal can supply the communication context information in the form of an SIP response message 200 OK.

According to a second variant, the supply method is implemented by a supply device capable of communicating with the first terminal in order to obtain the communication context information relating to the first terminal.

The various embodiments or features mentioned hereinafter may be added, independently or in combination with one another, to the steps of the supply method defined hereinabove. According to one particular embodiment of the invention, the communication context information relating to the first terminal comprises information relating to the connectivity of the first terminal.

According to this particular embodiment of the invention, the first terminal thus supplies to the second terminal information indicating the communications network to which the first terminal is connected and/or information indicating the communications network or networks to which the first terminal is able to connect.

According to another particular embodiment of the invention, said communication context information relating to the first terminal has been previously obtained from the first terminal and saved by a supply device with which the first terminal has previously been registered.

According to another particular embodiment of the invention, the supply method comprises a step for receiving, from the first terminal, information on change of communication context relating to the first terminal and a step for updating the saved communication context information relating to the first terminal.

According to this particular embodiment of the invention, the first terminal informs the supply device as soon as a change of the communication context relating to the first terminal occurs. Such a change corresponds for example to a change relating to the connectivity of the first terminal, for example following a change of communications network to which the first terminal is connected or after a significant variation of the bandwidth of the communications network to which the first terminal is connected. The change of the communication context relating to the first terminal may also correspond to the activation or to the disabling on the first terminal of a communications application installed on the first terminal. The change of the communication context relating to the first terminal may also correspond to a minimum battery level threshold or else to the activation or to the disabling of a sensor on the first terminal.

According to this particular embodiment of the invention, the supply device thus disposes of communication context information relating to the first terminal which is up to date.

According to another particular embodiment of the invention, prior to obtaining the communication context information relating to the first terminal, a registration request from the first terminal sent to the supply device comprises a notification token supplied by a notification server dedicated to an operating system of the first terminal. According to this particular embodiment of the invention, the obtaining of the communication context information relating to the first terminal is implemented by:
- a step for sending to the notification server a request for communication context information relating to the first terminal, the request for information comprising the notification token,
- a step for receiving from the first terminal the communication context information relating to the first terminal.

In a correlated manner, the invention relates to a device for supplying communication context information relating to a first terminal, comprising:
- a communications module designed to:
  - receive a request for context information relating to the first terminal, the request having been sent by a second terminal wishing to establish a communication with the first terminal,
  - supply to the second terminal said context information,
- a processing module capable of obtaining communication context information relating to the first terminal,
- a storage module designed to save the communication context information relating to the first terminal.

According to one particular embodiment of the invention, such a supply device is included within a server.

The invention also relates to a terminal for supplying communication context information relative to said terminal, comprising:
- a communications module designed to:
  - receive a request for context information relating to the first terminal, the request having been sent by another terminal wishing to establish a communication with said terminal,
  - supply said context information to the other terminal,
- a processing module capable of obtaining communication context information relating to said terminal.

The invention also relates to a communication context information message sent for the attention of a caller terminal, comprising at least one data field comprising communication context information relating to the called terminal, said communication context information allowing the caller terminal to determine a communication service to be used for establishing a communication with the called terminal.

The message thus allows the caller terminal to obtain communication context information relating to the called terminal.

In one particular embodiment of the invention, the various steps of the method for establishing a communication and for supplying communication context information are implemented by computer program instructions.

Consequently, the invention is also aimed at a computer program on an information medium, this program being able to be implemented respectively in a terminal or, more generally, in a computer, this program comprising instructions adapted to the implementation of the various steps of the methods which have just been described.

This program can use any programming language, and take the form of source code, object code, or of code intermediate between source code and object code, such as in a partially compiled form, or in any other desired form.

The invention is also aimed at an information medium readable by a computer, and comprising instructions of a computer program such as mentioned hereinabove.

The information medium may be any entity or device capable of storing the program. For example, the medium may comprise a storage means, such as a ROM, for example a CD ROM or a microelectronic circuit ROM, or else a magnetic or electronic registration means, for example a USB stick or a hard disk.

Furthermore, the information medium may be a transmissible medium such as an electrical or optical signal, which can be channeled via an electrical or optical cable, by radio or by other means. The program according to the invention may, in particular, be uploaded onto a network of the Internet type.

Alternatively, the information medium may be an integrated circuit within which the program is incorporated, the circuit being designed to execute or to be used in the execution of the method for establishing a communication or of the method for supplying communication context information in question.

The advantages of the computer program comprising instructions designed for the implementation of the various steps of the method for establishing a communication or of the method for supplying communication context information are identical to those presented in relation with the method in question according to any one of the particular embodiments mentioned hereinabove.

LIST OF THE FIGURES

Figure 2:
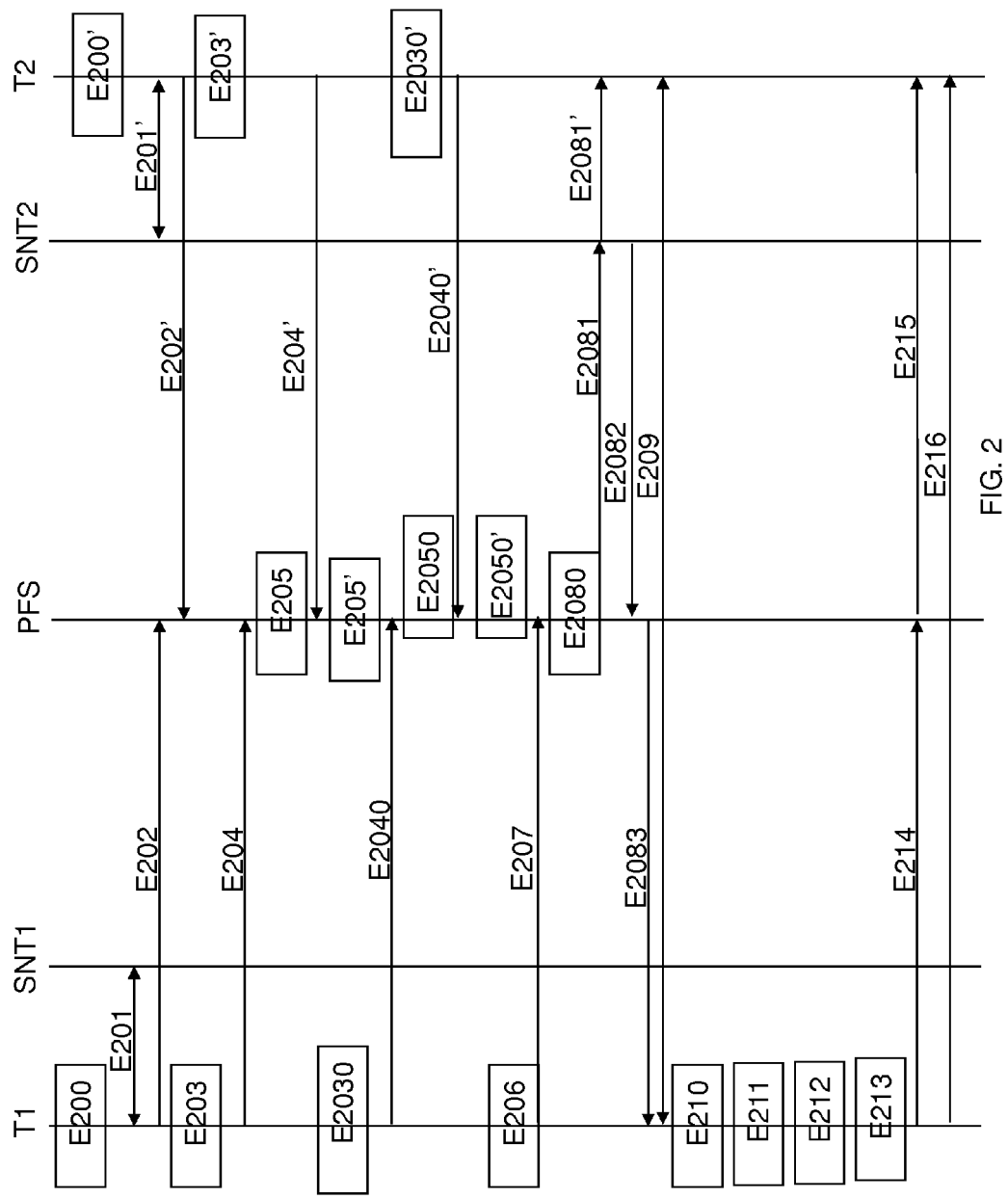

Other advantages and features of the invention will become more clearly apparent upon reading the following description of particular embodiments of the invention, presented simply by way of illustrative and non-limiting examples, and the appended drawings, amongst which:

FIG. 1 illustrates an environment for implementation of the invention according to one particular embodiment of the invention, FIG. 2 illustrates steps of the method for establishing a communication between at least one caller terminal and one called terminal and steps of the method for supplying communication context information relating to the called terminal according to one particular embodiment of the invention, FIG. 3 illustrates a device capable of implementing the method for establishing a communication between at least one caller terminal and one called terminal according to one particular embodiment of the invention, FIG. 4 illustrates a device capable of implementing the method for supplying communication context information relating to a first terminal according to one particular embodiment of the invention, FIG. 5 illustrates a message comprising communication context information according to one particular embodiment of the invention.

DESCRIPTION OF ONE PARTICULAR EMBODIMENT OF THE INVENTION

The environment described in FIG. 1 comprises a group of communications networks Res1, Res2 and Res3 interconnected together via interconnection servers (not shown). The communications networks Res1, Res2 and Res3 may be managed by the same communications operator or by different communications operators. The communications networks Res1, Res2 and Res3 may be any type of communications networks allowing data to be exchanged and communications to be established between terminals connected to any one of the communications networks Res1, Res2 or Res3.

For example, the communications network Res1 is a mobile communications network of the GSM, EDGE, 3G, or 3G+ type operating in circuit mode for the establishment of voice communication. The communications network Res1 is for example based on an RCS architecture for the transmission of IP data.

The communications network Res3 is for example a mobile communications networks of the 4G type based on an IMS (for IP Multimedia Subsystem) architecture or a fixed IP communications network using a WiFi access network.

The communications network Res2 is for example a mobile communications network of the 4G type based on an IMS architecture.

The environment in FIG. 1 also comprises terminals T1 and T2 respectively connected to the communications network Res1 and to the communications network Res2.

The terminals T1 and T2 may be any type of terminals allowing a telephone or videophone communication to be established, such as a mobile telephone, a smartphone, a tablet, a television connected to a communications network, a personal computer on which a telephony application, also called softphone, is installed, or any object connected to a communications network.

In the example described in FIG. 1, the terminal T1 is connected to the communications network Res1 but is located close to a point of access to the communications network Res3 and is able to connect thereto.

The environment in FIG. 1 also comprises notification servers dedicated to an operating system of a terminal, such as in particular the terminal T1 and/or the terminal T2. Such notification servers allow a server of an operator or of a service provider to obtain information relating to a terminal supporting the corresponding operating system and to communicate with this terminal in order to notify it of information or of events. For this purpose, such a terminal sends information to the notification server with which it is associated, notably information relating to the terminal and to the applications installed on this terminal.

In order for the server of the operator or of the provider to be able to communicate with such a terminal, an application dedicated to such a server and installed on the terminal sends a token request to the notification server. Such a token comprises an identifier associating the terminal and the application generating the token request. The notification server sends, in return, the token comprising the identifier to the terminal. The server of the operator or of the service provider subsequently communicates with the terminal by sending messages comprising the token to the notification server which transmits them to the terminal.

A notification server dedicated to an operating system of a terminal corresponds for example to an APNS (for Apple Push Notification Service) server supplied by Apple© or a C2M (Cloud To Messaging) server supplied by Google©.

According to one particular embodiment of the invention, the environment in FIG. 1 also comprises a service platform PFS allowing a first terminal, for example T1, to register itself with the service platform PFS and to obtain communication context information relating to a second terminal, for example T2, also registered with the service platform PFS. When a user of the terminal T1 wishes to communicate with a user of the terminal T2, the terminal T1 can then determine an application to be used for establishing the communication depending on the communication service providing for example the best quality of service. The service platform PFS is for example connected to the communications network Res1. The service platform PFS and the terminals T1 and T2 communicate for example via a TCP/IP or HTTP link.

According to another particular embodiment of the invention, the method for establishing a communication according to the invention is implemented by the terminal T1 without the use of the service platform PFS. According to this particular embodiment of the invention, the terminal T1 obtains communication context information relating to the terminal T2 directly from the terminal T2. Once the communication context information relating to the terminal T2 has been obtained, the terminal T2 determines the communication service to be used for establishing a communication with the terminal T2.

According to another particular embodiment of the invention, the environment in FIG. 1 comprises a module ANDSF1 for managing selection of networks associated with the terminal T1 and a module ANDSF2 for managing selection of networks associated with the terminal T2. Such a module ANDSF1, respectively ANDSF2, is for example an ANDSF (for Access Network Discovery and Selection Function, defined by the 3GPP standard) module of the communications network Res1, respectively Res2, managed by the operator of the terminal T1, respectively T2. Such a module ANDSF1, respectively ANDSF2, allows the operator of the terminal T1, respectively T2, to prompt the terminal T1, respectively T2, to connect to a communications network predetermined as a function of criteria defined by the operator of the terminal T1, respectively T2.

Steps of the method for establishing a communication between at least one caller terminal T1 and a called terminal T2 and steps of the method for supplying communication context information relating to the called terminal will now be described in relation with FIG. 2. The method for establishing a communication between the terminal T1 and the terminal T2 is implemented by the terminal T1, for example by an application ONE_COM previously installed on the terminal T1 by the user of the terminal T1 or supplied by the operator of the terminal T1.

In a correlated manner, one occurrence of the application ONE_COM is also installed on the terminal T2.

According to the invention, the application ONE_COM allows the terminal T1 to communicate with the service platform PFS described in FIG. 1 and to determine a communication service to be used for establishing a communication with the terminal T2. The establishment of the communication with the terminal T2 is thus facilitated for the user of the terminal T1, because the user of the terminal T1 only has to request, via the activation of the application ONE_COM, the establishment of a communication with the terminal T2.

During a step E200, the terminal T1 obtains at least one piece of communication context information relating to the terminal T1. For this purpose, the terminal T1 scans its memory in order to identify the communications applications installed on the terminal T1, such as the communications applications supplied by an OTT service provider. The terminal T1 thus detects for example an application APP_OTT allowing a voice, videophone or text communication to be established via a connection to an IP communications network.

The terminal T1 also detects a native communications application APP_OP supplied by the operator of the terminal T1 and allowing a communication to be established via the communications network of the operator or an interconnected communications network. When a communication according to the application APP_OP is established, the communication service implemented for establishing the communication depends on the type of connectivity of the terminal T1 at the time of the request for establishing the communication. The terminal T1 may be connected to a 3G mobile communications network or to a mobile communications network operating in circuit mode only providing a communication service in voice mode, or a 4G mobile communications network supplying a communication service in voice mode or in videophone mode.

The terminal T1 also detects a communications application APP_RCS, which may be a communications application native to the terminal T1 or which has been installed on the terminal T1 by the user of the terminal T1. The application APP_RCS allows a voice or videophone communication according to the RCS standard to be established via for example a connection to a mobile communications network operating in circuit mode for the audio part of the communication and via a connection to an IP mobile communications network for the video or data part of the communication or, according to another example, via a connection to an IP communications network for the audio and video part. According to any one of these examples, the quality of service is not however guaranteed for the transmission of the data over the mobile IP communications network.

During a step E201, the terminal T1 detects that it is connected to a communications network, for example a communications network of the WiFi, 2G, 3G or 4G type.

According to a first variant embodiment of the invention, during the step E201, the terminal T1 sends a request for a notification token to the notification server SNT1 described in relation with FIG. 1. During the step E201, the server SNT1 supplies to the terminal T1 a notification token associated with the terminal T1 and with the application ONE_COM installed on the terminal T1.

During a step E202, the terminal T1 sends a registration request to the service platform PFS by inserting the notification token received during the step E201. The registration request notably comprises contact information for the terminal T1, for example a telephone number of the terminal T1. The registration request may also comprise information on the capacities of the terminal T1, such as the protocols supported, the communications applications installed, the connectivity of the terminal T1, or else the camera, microphone, battery level parameters of the terminal T1, etc.

The connectivity of the terminal T1 corresponds for example to the communications networks to which the terminal T1 is connected and to the communications networks to which the terminal T1 is able to connect.

Such information on capacities of the terminal T1 corresponds to communication context information. Indeed, such capacities are used when a communication is established between the terminal T1 and another terminal.

During the step E202, the service platform PFS receives the registration request. During the step E202, the service platform PFS registers the terminal T1 and saves the notification token associated with the terminal T1, together with the information on capacities of the terminal T1. The notification token associated with the terminal T1 allows the service platform PFS to communicate later on with the terminal T1 via the notification server SNT1 and, according to this first variant, notably to obtain at least one communication context information relating to the terminal T1.

According to a second variant embodiment of the invention, the terminal T1 does not request a notification token from the server SNT1 during the step E201. The terminal T1 registers itself directly with the service platform PFS during the step E202.

According to this second variant, during a step E203, the terminal T1 regularly detects the nearby communications networks to which the terminal T1 is able to connect and the communications network to which the terminal T1 is connected. During a step E204 regularly implemented, the terminal T1 sends communication context information to the service platform PFS. For example, the terminal T1 sends information on its connectivity.

During the step E204, the service platform PFS receives the communication context information. During a step E205, the service platform PFS saves such information in association with the registration of the terminal T1.

Depending on the particular embodiment of the invention implemented, either one of the first and second variant embodiments may be implemented or both variant embodiments may be implemented.

According to one particular embodiment of the invention, during a step E2030, the terminal T1 regularly detects a change of communication context, such as for example: a change of connectivity, reaching a minimum threshold for the level of the battery of the terminal T1, the disabling or the activation of a communications application, etc. During a step E2040, the terminal T1 sends, to the service platform PFS, information on the change of communication context detected during the step E2030. During the step E2040, the service platform receives the information on the change of communication context sent by the terminal T1 then, during a step E2050, saves such information in association with the registration of the terminal T1.

According to the first variant embodiment, when the terminal T1 sends to the service platform communication context information (step E204) or a change of communication context (step E2040), the terminal T1 also sends the notification token received during the step E201.

The description of the steps E200' to E205', E2030', E2040' and E2050' carried out for the terminal T2 is identical to those of the corresponding steps E200 to E205, E2030, E2040 and E2050.

During a step E206, the terminal T1 detects the activation of a request for communication with the terminal T2. For example, the user of the terminal T1 has selected contact information relating to the terminal T2 in the directory of the terminal T1 and has asked the terminal T1 to establish a communication with the terminal T2. The user of the terminal T1 may have requested the establishment of a communication for example by pushing a physical button of the terminal T1, such as a key of the terminal T1, or by clicking a button displayed on a touchscreen interface of the terminal T1 or else by voice command, for example by speaking the command "call".

According to one particular embodiment of the invention, during the step E206, during the request for establishment of a communication, the user of the terminal T1 can specify the mode of communication according to which the requested communication must be established. For example, the button of the terminal T1 used for the communication request is dedicated to a predetermined mode of communication, for example voice mode or videophone mode.

According to another particular embodiment of the invention, during the step E206, during the request for establishment of a communication, the user of the terminal T1 may not specify the mode of communication according to which the requested communication must be established. In this embodiment of the invention, the user of the terminal T1 lets the terminal T1, and more precisely the application ONE_COM, determine the mode of communication according to which the requested communication will be established.

Following the step E206, during a step E207, the terminal T1 sends a request to the service platform for communication context information relating to the terminal T2. The request for communication context information sent by the terminal T1 notably comprises contact information for the terminal T2, for example the telephone number of the terminal T2.

During the step E207, the service platform PFS receives the request for communication context information relating to the terminal T2.

During a step E2080, the service platform obtains communication context information relating to the terminal T2 based on information saved in association with the terminal T2. According to one particular embodiment of the invention, during a step E2081, the service platform PFS sends a request for communication context information to the notification server SNT2, for example information relating to the connectivity of the terminal T2. Such a request for context information is sent, for example, via a TCP/IP or HTTP link. The request for context information notably comprises the notification token associated with the terminal T2 received during the step E201' for registration of the terminal T2.

During a step E2081', by virtue of the notification token, the notification server SNT2 notifies the terminal T2 of such a request for context information in order for the terminal T2 to update the information on communication context relating to it, such as the connectivity of the terminal T2 and the communications applications available on the terminal T2.

Thus, during a step E2082, the terminal T2 sends the updated information on communication context relating to the terminal T2 to the service platform PFS.

During a step E2083, the service platform PFS sends to the terminal T1 at least one piece of communication context information relating to the terminal T2 obtained during the step E2080 or received during the step E2082.

According to one particular embodiment of the invention, when the terminal T1 supports the RCS standard, during a step E209, the terminal T1 sends a message OPTIONS according to the SIP protocol to the terminal T2, via the communications network Res1 in FIG. 1. Such a message OPTIONS is a message for discovering the RCS communication capacities of the terminal T2. The terminal T2 responds to the terminal T1 during the step E209 with a message 200 OK comprising the RCS communication capacities of the terminal T2.

During a step E210, the terminal T1 then updates the communication services which may be used for establishing a communication with the terminal T2. During the step E210, the terminal T1 identifies the communication services available that can be implemented both by the terminal T1 and by the terminal T2 based on communication context information relating to the terminal T1 obtained during the steps E200 and E203 and based on communication context information relating to the terminal T2 received at the step E209.

For example, such services are:
- if the terminal T1 and the terminal T2 are connected to a 4G communications network, a communication service in voice mode or in videophone mode over such a communications network,
- if the terminal T1 and the terminal T2 are connected to a 3G communications network, a communication service in voice mode operating in circuit mode or a communication service in VoIP voice mode,
- if the terminal T1 and the terminal T2 are connected to a WiFi communications network and each dispose of a communications application supplied by an OTT service provider, the communication service in voice mode or in videophone mode provided by such an application,
- if the terminal T1 and the terminal T2 are connected to a 3G communications network and support the RCS standard, a voice communication service with RCS functionalities.

According to one particular embodiment of the invention, when the user of the terminal T1 has not specified the desired mode of communication during the step E206 for requesting establishment of a communication, a communication mode is determined by the terminal T1 during a step E211.

For this purpose, the terminal T1 for example takes into account the communication habits between the terminal T1 and the terminal T2, based on a communications history established between the terminal T1 and the terminal T2 during a recent period, for example in the course of the last months, or the last weeks. The terminal T1 stores, for example for each possible mode of communication, historical information representing the frequency of communication between the terminal T1 and the terminal T2 according to the mode of communication being considered. The terminal T1 may also store information indicating one or more modes of communication according to which the user of the terminal T1 does not wish to communicate. Such information may have been previously defined by the user of the terminal T1.

In the directory of the terminal T1, the contact information for the terminal T2 may also comprise information indicating one or more modes of communication according to which the user of the terminal T2 does not wish to communicate. Such information may have been previously obtained from the service platform PFS or via a message OPTIONS when the communication capacities of the terminal T2 were discovered.

According to another example, the communication history information is not defined with respect to communications previously established with the terminal T2 but with respect to communications previously established by the terminal T1 with all of the contacts in its directory. The historical information stored for each mode of communication then represents the frequency of communication according to this mode of communication of the terminal T1 with all its contacts. According to this example, the terminal T1 may also dispose, for each mode of communication that may be implemented by the terminal T2, of information on communication preference relating to the terminal T2. This information on preference defines for example an order of preference of the modes of communication according to which the user of the terminal T2 prefers to communicate. Or else, the information on preference associated with a mode of communication represents the frequency with which the terminal T2 communicates with all of its contacts according to the mode of communication being considered. The information on preference relating to the terminal T2 may have previously been obtained from the service platform PFS or via a message OPTIONS when the communication capacities of the terminal T2 were discovered.

Using the historical information defined according to any one of the examples described hereinabove, and potentially the information on preference of the terminal T2, the terminal T1 determines, during the step E211, a mode of communication according to which the communication will be established. For example, if the user of the terminal T1 and the user of the terminal T2 communicate more frequently in videophone mode than in voice or text mode, the mode of communication determined will be the videophone mode of communication.

During the step E211 for determining the mode of communication, the terminal T1 takes into account, when it exists, the information indicating one or more modes of communication according to which the user of the terminal T1 or of the terminal T2 does not wish to communicate.

According to the preceding example, if a communication in videophone mode is not possible between the terminal T1 and the terminal T2, and if the frequency of communication between the terminal T1 and the terminal T2 according to voice mode and text mode is the same, but the user of the terminal T1 does not wish to communicate in text mode, the terminal T1 determines the voice mode of communication.

During a step E212, the terminal T1 determines the communication service to be used for establishing the communication requested at the step E206 depending on the mode of communication determined during the step E210 or depending on the mode of communication indicated during the request for establishing a communication generated at the step E206. For example, the user of the terminal T1 has indicated a request for establishing a communication in videophone mode.

According to one particular embodiment of the invention, the determination of the communication service is carried out by the selection of the communication service offering the best quality of service from amongst the communication services identified during the step E210. For example, if the terminal T1 and the terminal T2 are connected to a 4G communications network, the communication service in videophone mode over such a communications network is selected because such a communication service provides a guaranteed quality of service.

Otherwise, if the terminal T1 is connected to a 4G communications network or to a 3G communications network and supports the RCS standard, and the terminal T2 is connected to a 3G communications network and supports the RCS standard, the voice communication service with RCS and notably videophone functionalities is selected.

Otherwise, if the terminal T1 and the terminal T2 are connected to a WiFi communications network and each dispose of a communications application supplied by an OTT service provider, the communication service in videophone mode supplied by such an application is selected.

Otherwise, in the case where no videophone communication service is available between the terminal T1 and the terminal T2, for example because one of the two terminals is not connected to a 4G communications network, or to a 3G communications network or else one of the two terminals does not support the RCS standard, the terminal T1 switches the requested communication into voice mode and the communication service selected is a communication service in voice mode operating over a communications network in circuit mode.

According to another particular embodiment of the invention, the communication service is for example selected as a function of the traffic conditions of the communications network to which the terminal T1 is connected. For example, if the communication context information relating to the terminal T1 indicates that the 4G communications network to which the terminal T1 is connected no longer disposes of any available bandwidth, the terminal T1 selects:
 the voice communication service with RCS functionalities supplied by a 3G communications network if the terminal T1 and the terminal T2 support the RCS standard,
 or else the communication service in videophone mode supplied by a communications application of an OTT service provider if the terminal T1 and the terminal T2 are connected to a WiFi communications network,
 or else the terminal T1 switches into voice mode over a mobile communications network operating in circuit mode otherwise.

During a step E216, the terminal T1 sends a communication request to the terminal T2 according to the communication service determined during the step E212. For example, if the communication service determined corresponds to the communication service in videophone mode provided by a 4G communications network, the communication request sent by the terminal T1 is a message INVITE according to the SIP protocol. The requested communication is subsequently established according to the known procedures for establishing a communication according to the communication service determined.

According to one particular embodiment of the invention, the communication context information relating to the caller terminal T1 or to the called terminal T2 comprises at least one communications network to which the caller terminal or the called terminal is able to connect.

According to this particular embodiment of the invention, the terminal T1 also identifies, from amongst the communication services available between the terminal T1 and the terminal T2, a communication service supplied by a communications network to which the caller terminal or the called terminal is able to connect.

For example, in FIG. 1, the terminal T1 is connected to the communications network Res1, for example a 3G communications network, and is able to connect to the communications network Res3, for example a 4G communications network.

In this example, if the terminal T2 is connected to a 4G communications network, during the step E212, the terminal T1 selects the communication service in videophone mode provided by the 4G communications network.

During a step E213, the terminal T1 changes connectivity by connecting to the 4G communications network Res3 by sending a registration message REGISTER according to the SIP protocol to a server of the communications network Res3.

When the terminal T1 has received the acknowledgement from the communications network Res3 confirming its registration in the communications network Res3, during the step E216, the terminal T1 sends, via the communications network Res3, for the attention of the terminal T2, a communication request according to the protocol used by the selected communication service.

According to another example, the terminal T1 is connected to a 4G communications network. According to this example, the terminal T2 is connected to a 3G communications network and is able to connect to a 4G communications network. During the step E212, the terminal T1 then selects the communication service in videophone mode provided by the 4G communications network.

According to this example, during a step E214, the terminal T1 sends a request for connection to the 4G communications network to the terminal T2. Such a request may be sent, via the 4G communications network to which the terminal T1 is connected, to the service platform PFS. In this case, during a step E215, the service platform PFS communicates with the terminal T2, via the notification server SNT2, in order to ask the terminal T2 to connect to the 4G communications network to which it is able to connect.

As a variant, the service platform PFS can communicate with the management module ANDSF2 associated with the terminal T2 in order for the module ANDSF2 to prompt the terminal T2 to connect to the 4G communications network. This variant is possible if the module ANDSF2 is managed by the same operator as the operator managing the service platform PFS, or if the operator managing the module ANDSF2 has authorized an interconnection with the operator managing the service platform PFS.

When the terminal T2 has connected to the 4G communications network, an acknowledgement message is transmitted (not shown) by the terminal T2 to the terminal T1, potentially via the service platform or the module ANDSF2. During the step E216, the terminal T1 then sends a communication request to the terminal T2 conforming to the communication service determined during the step E212.

According to one particular embodiment of the invention, the steps E210, E211 and E212 are implemented by the service platform PFS. In this case:

following the step E206, the terminal T1 transmits information to the service platform PFS indicating the activation, on the terminal T1, of a request for establishing a communication with the terminal T2, following the step E212, the service platform PFS transmits information to the terminal T1 indicating the communication service determined in the step E212 in order that, during the step E216, the terminal T1 can send a communication request depending on the communication service determined.

According to another particular embodiment of the invention, the method for establishing a communication is implemented without the use of the service platform. According to this particular embodiment of the invention, the steps E201, E202, E204, E205, E2030 and E2040 are not implemented.

In this particular embodiment of the invention, the steps E200, E200', E203, E203' and E206 are carried out as previously described.

Following the step E206, in order to obtain the context information from the terminal T2, during the step E207, the terminal T1 sends a request to the terminal T2 for communication context information relating to the terminal T2. Such a request may for example be implemented by sending an SIP message OPTIONS dedicated to the communication context information of the invention. During the step E2083, the terminal T2 responds to the terminal T1 by supplying communication context information, such as for example information on the connectivity of the terminal T2, and/or the communication capacities of the terminal T2. A message comprising such context information will be described hereinbelow in relation with FIG. 5. Such a message may for example be sent in the form of an SIP message 200 OK.

As a variant, other protocols defining messages specific to the subject of the invention may be used to allow the terminal T1 to request the communication context information relating to the terminal T2 and to enable the terminal T2 to supply said communication context information.

The steps E209 to E213 are identical to those described with the embodiment using the service platform PFS.

During the optional step E214, the terminal T1 communicates directly with the terminal T2 in order to ask the terminal T2 to connect to the communications network over which the communication service determined at the step E212 is supplied.

The step E216 is identical to the particular embodiment previously described.

FIG. 3 illustrates a terminal 30, referred to as caller terminal, capable of implementing the method for establishing a communication with a called terminal according to one particular embodiment of the invention.

The terminal 30 comprises a processing module 31, notably comprising a storage module MEM, for example a memory, and a central processing unit PROC, equipped for example with a microprocessor. The central processing unit PROC is controlled by a computer program PG implementing the method for establishing a communication with a called terminal such as described in relation with FIG. 2. The computer program PG corresponds for example to the application ONE_COM described in relation with FIG. 2. On initialization, the code instructions of the computer program PG are for example loaded into memory MEM before being executed by the processor of the central processing unit PROC.

The processor of the central processing unit PROC implements the steps of the method for establishing a communication with a called terminal, according to the instructions of the computer program PG. The processor of the central processing unit PROC notably implements:

a step for detecting the activation by the caller terminal of a request for establishing a communication with the called terminal, a step for obtaining a first piece of communication context information relating to the caller terminal, a step for obtaining at least a second piece of communication context information relating to the called terminal, a step for determining a communication service to be used for establishing said requested communication destined for the called terminal, the determination being carried out based on at least the first piece of communication context information and the second piece of communication context information, a step for sending a communication request to the called terminal according to the communication service determined.

The terminal 30 also comprises a user interface INT capable of detecting the activation of a request for establishing a communication with the called terminal. Such a user interface is for example a digital keyboard or a touchscreen interface allowing a user to interact on the terminal 30.

According to one particular embodiment of the invention, the user interface INT notably comprises a button able to be activated for requesting the establishment of a communication with a previously selected contact. The button may be dedicated to a predetermined mode of communication: voice, video, text communication. The button is interfaced with the processing module in such a manner that the processing module triggers the execution of the instructions of the computer program PG following the detection of the activation of the button. Such a button may be a physical button of the terminal 30 or a button displayed on a touchscreen interface of the terminal.

The processing module 31 is notably capable of:
obtaining communication context information relating to the caller terminal,
obtaining communication context information relating to the called terminal,
determining, based on at least one piece of communication context information relating to the caller terminal and one piece of communication context information relating to the called terminal, a communication service to be used for establishing a communication requested via the user interface INT.

The terminal 30 also comprises a communications module COM allowing the terminal 30 to connect to a communications network and to exchange data with terminals connected to this communications network, or to establish communications with other terminals.

The communications module COM is notably capable of sending a communication request to the called terminal according to the communication service determined.

The communications module COM is capable of receiving, from the called terminal or from a service platform with which the caller terminal and the called terminal have previously registered, the communication context information relating to the called terminal.

According to one particular embodiment of the invention, the terminal 30 comprises a notification module NOT capable of sending a request for a notification token to a notification server dedicated to an operating system of the terminal 30. According to this particular embodiment of the invention, the processing module 31 is capable of inserting the notification token into a registration request and of sending the registration request, via the communications module COM, to the service platform.

According to another particular embodiment of the invention, the notification module NOT is capable of sending a notification to the service platform of a change of the communication context relating to the caller terminal.

According to one particular embodiment of the invention, the terminal 30 is a terminal such as a mobile terminal, or a fixed terminal, or a tablet.

FIG. 4 illustrates a device 40 designed to implement the method for supplying communication context information relating to a first terminal according to one particular embodiment of the invention.

The device 40 comprises a processing module 41, notably comprising a storage module MEM', for example a memory, and a central processing unit PROC', equipped for example with a microprocessor. The central processing unit PROC' is controlled by a computer program PG' implementing the method for supplying communication context information relating to a first terminal such as described in relation with FIG. 2.

On initialization, the code instructions of the computer program PG' are for example loaded into memory MEM' prior to being executed by the processor of the central processing unit PROC'.

The processor of the central processing unit PROC' implements the steps of the method for supplying communication context information relating to a first terminal, according to the instructions of the computer program PG'. The processor of the central processing unit PROC' notably implements:
a step for receiving a request for communication context information relating to the first terminal, the request having been sent by a second terminal wishing to establish a communication with the first terminal,
a step for supplying said context information relating to the first terminal.

The processing module 41 is notably capable of obtaining communication context information relating to the first terminal.

According to one particular embodiment of the invention, the device 40 is included within a terminal, for example the terminal T2 in FIG. 1. According to one particular embodiment of the invention, the terminal 40 may be a mobile terminal, or a fixed terminal, or a tablet, etc.

According to this particular embodiment of the invention, the processing module 41 implements, for example, the step E200' for obtaining communication context information relating to the first terminal.

According to another particular embodiment of the invention, the device 40 is included within a server. According to this particular embodiment of the invention, the processing module 41 implements, for example, the step E2080 and/or the steps E2081 and E2082.

According to this particular embodiment of the invention, the storage module MEM' is notably able to save the communication context information relating to the first terminal.

The device 40 also comprises a communications module COM' allowing the device 40 to connect to a communications network and to exchange data with terminals connected to this communications network, or to establish communications with other terminals. The communications module COM' is notably capable of:
receiving a request for context information relating to the first terminal, the request having been sent by a second terminal wishing to establish a communication with the first terminal, supplying said context information to the second terminal.

According to one particular embodiment of the invention, the communications module COM' is capable of receiving information on change of communication context relating to the first terminal.

According to another particular embodiment of the invention, the communications module COM' is capable of receiving a registration request from the first terminal.

As a variant of this other particular embodiment of the invention, the communications module COM' is capable of receiving a registration request from the first terminal and comprises a token for notifying a notification server dedicated to an operating system of the first terminal. The processing module 41 is capable of extracting such a notification token and of saving it in the storage module MEM'.

FIG. 5 illustrates a part of a message M comprising communication context information relating to a terminal, for example the terminal T2 in FIG. 1. The message M is sent to the terminal T1 during the step E2083 described in relation with FIG. 2. By virtue of the communication context information for the terminal T2 included within the message M and of communication context information for the terminal T1, the terminal T1 determines a communication service to be used for establishing a communication with the terminal T2. According to a first particular embodiment of the invention, the message M is sent by the service platform PFS. In this case, the message M is sent in the form of an http response for example.

According to a second particular embodiment of the invention, the message M is sent by the terminal T2. In this case, the message M is sent in the form of an SIP message 200 OK for example.

The message M comprises for example a data field C1 indicating the type of access network to which the terminal T2 is connected, for example the network Res2 in FIG. 1.

The message M comprises for example a data field C2 indicating at least one access network to which the terminal T2 is able to connect, for example the network Res1 in FIG. 1.

The message M may also comprise a data field C3 indicating a communications application supported by the terminal T2, for example the application APP_OTT supplied by an OTT service provider.

The invention claimed is:

1. A method of establishing a communication between at least one caller terminal and a called terminal, comprising:
   detecting, by the caller terminal, a user interaction requesting the establishment of a communication with the called terminal;
   obtaining a first piece of communication context information relating to the caller terminal, said first piece of communication context information corresponding to information on connectivity of the caller terminal and/or to at least one communications application installed on the caller terminal;
   obtaining at least a second piece of communication context information relating to the called terminal, said second piece of communication context information corresponding to information on connectivity of the called terminal and/or to at least one communications application installed on the called terminal;
   determining a communication service to be used for establishing said requested communication with the called terminal, the determination being carried out based on at least the first piece of communication context information and the second piece of communication context information;
   sending, to the called terminal, a communication request according to the communication service determined;
   wherein, when the called terminal is connected to a third communications network which is different from a second communications network over which the communication service determined is implemented, the method further comprises sending, for the attention of the called terminal, a request for connection of the called terminal to the second communications network, such that the called terminal connects to the second communications network.

2. The method of establishing a communication as claimed in claim 1, wherein, when at least two communication services can be implemented between the caller terminal and the called terminal, the determination process comprises selecting, from among said communication services, a communication service supplying the best quality of service.

3. The method of establishing a communication as claimed in claim 1, wherein, when the caller terminal is connected to a first communications network which is different from a second communications network over which the communication service determined is implemented, the method further comprises connecting the caller terminal to the second communications network.

4. The method of establishing a communication as claimed in claim 1, wherein, when the request for establishing a communication is carried out for at least two modes of communication, the communication context information relating to the caller terminal comprises history information relating to a history of communications previously established between the caller terminal and the called terminal and the method further comprises determining a mode of communication as a function of said history information, the communication service being determined for the mode of communication determined.

5. A caller terminal configured to establish communication with a called terminal, said caller terminal being configured to:
   detect a user interaction requesting the establishment of a communication with the called terminal;
   obtain a first piece of communication context information, said first piece of communication context information corresponding to information on connectivity of the caller terminal and/or to at least one communications application installed on the caller terminal;
   obtain a second piece of communication context information, said second piece of communication context information corresponding to information on connectivity of the called terminal and/or to at least one communications application installed on the called terminal;
   determine, based on at least the first piece of communication context information and the second piece of communication context information, a communication service to be used for establishing a communication requested via the user interface; and
   send, to the called terminal, a communication request according to the communication service determined;
   wherein said caller terminal is further configured such that, when the called terminal is connected to a third communications network which is different from a second communications network over which the communication service determined is implemented, the caller terminal sends, for the attention of the called terminal, a request for connection of the called terminal to the second communications network, such that the called terminal connects to the second communications network.

6. A non-transitory computer readable medium having stored thereon instructions, which, when executed by a processor, cause a caller terminal to perform a method of establishing communication with a called terminal, wherein the method comprises:

detecting, by the caller terminal, a user interaction requesting the establishment of a communication with the called terminal;

obtaining a first piece of communication context information relating to the caller terminal, said first piece of communication context information corresponding to information on connectivity of the caller terminal and/or to at least one communications application installed on the caller terminal;

obtaining at least a second piece of communication context information relating to the called terminal, said second piece of communication context information corresponding to information on connectivity of the called terminal and/or to at least one communications application installed on the called terminal;

determining a communication service to be used for establishing said requested communication with the called terminal, the determination being carried out based on at least the first piece of communication context information and the second piece of communication context information; and sending, to the called terminal, a communication request according to the communication service determined;

wherein, when the called terminal is connected to a third communications network which is different from a second communications network over which the communication service determined is implemented, the method further comprises sending, for the attention of the called terminal, a request for connection of the called terminal to the second communications network, such that the called terminal connects to the second communications network.

* * * * *